United States Patent [19]

Hyde

[11] Patent Number: 5,103,865
[45] Date of Patent: Apr. 14, 1992

[54] INTEGRALLY MOLDED VAPOR VENT VALVE

[75] Inventor: James P. Hyde, Saline, Mich.

[73] Assignee: Ford Motor Company, Dearborn, Mich.

[21] Appl. No.: 729,766

[22] Filed: Jul. 15, 1991

[51] Int. Cl.$^5$ .............................................. F16K 24/00
[52] U.S. Cl. ..................................... 137/588; 137/43; 137/318; 137/589; 220/86.1
[58] Field of Search .................. 137/587, 588, 599, 39, 137/43, 318; 220/86.1

[56]  References Cited
U.S. PATENT DOCUMENTS

| 2,760,775 | 8/1956 | Tipton | 273/58 |
| 3,450,805 | 6/1969 | Chesser | |
| 3,592,886 | 7/1971 | Havely | 264/98 |
| 3,614,960 | 10/1971 | Pfrengle | 137/43 |
| 3,917,109 | 10/1975 | MacDonald | 137/587 |
| 4,095,609 | 6/1978 | Martin | 137/43 |
| 4,323,411 | 4/1982 | Uhlig | 156/245 |
| 4,342,799 | 8/1982 | Schwochert | 428/35 |
| 4,396,562 | 8/1983 | Heaume | 264/23 |
| 4,608,744 | 9/1986 | Nemoto | 29/527.1 |
| 4,753,262 | 6/1988 | Bergsma | 137/39 |
| 5,022,421 | 6/1991 | Johnson | 137/318 |

FOREIGN PATENT DOCUMENTS

| 2304543 | 1/1973 | Fed. Rep. of Germany . |
| 55-105539 | 8/1980 | Japan . |
| 57-2728 | 1/1982 | Japan . |

Primary Examiner—A. Michael Chambers
Attorney, Agent, or Firm—Damian Porcari; Clifford L. Sadler

[57] ABSTRACT

A molded assembly comprising a wall made from a plastic sheet that is pliable at a first elevated temperature. A body having a penetrating portion and a connecting portion forms an aperture in the wall, the connecting portion extends through the aperture and is made from a material resistant to melting at the first temperature. The connecting portion is made from a material that will at least partially melt at the first temperature. The connecting portion engages one surface of the wall, whereby when the wall is raised to the first temperature, the connecting portion partially melts and becomes integral with the wall when returned to ambient temperature.

14 Claims, 2 Drawing Sheets

INTEGRALLY MOLDED VAPOR VENT VALVE

BACKGROUND OF THE INVENTION

The present invention generally relates to a vapor vent valve used in combination with a fuel tank employed in an automotive vehicle and, more particularly, to a vapor vent valve capable of being integrally molded directly into a polymeric fuel tank employed in an automotive vehicle.

Fuel tanks employed in automotive vehicles require means for keeping the internal pressure within the fuel tanks substantially in equilibrium with atmosphere. Various conditions, such as extremes of heat and cold, will affect the internal pressure within the internal chamber of a fuel tank. Likewise, as fuel is withdrawn from a tank, the internal pressure therein will also change. Vent/relief mechanisms have been employed in the prior art in order to keep the internal pressure within a tank substantially at equilibrium with atmosphere. Such a vent/valve mechanism may comprise a vapor vent valve connected, by way of a conduit, to a carbon canister where vapors from the tank are collected and eventually delivered to the engine for combustion.

The vapor vent valves employed in the vent/relief mechanisms normally include means for preventing fuel from leaking out of a tank if, for example, the vehicle travels along a steep incline causing fuel to enter into the vapor vent valve or if a roll-over accident occurs. The means employed for preventing fuel leakage may comprise a known internal shut-off mechanism included within the vapor vent valve.

It is also known in the prior art to use fuel tanks made from polymeric materials, such as polyethylene, in automotive vehicles. Such fuel tanks are advantageous because they resist corrosion and can be easily formed having various shapes and sizes, thus permitting flexibility in their design. Further, since polymeric fuel tanks are lightweight, they make the vehicles in which they are employed more fuel efficient and economical to operate.

Arrangements for mounting vapor vent valves onto fuel tanks are known in the prior art. One such arrangement is disclosed in U.S. Pat. No. 4,753,262, wherein an outer plastic casing of the valve is formed with external threads for threadably connecting the valve within an opening in a fuel tank.

Another arrangement for attaching the vapor vent valve to a fuel tank is taught in copending application Ser. No. 07/572,078 (CIP), which teaches the hot plate welding of the vapor vent valve directly to the outer surface of the fuel tank wall. This process requires the drilling of an opening in the molded fuel tank and welding the vapor vent valve to the fuel tank wall.

It is desirable to provide a method of attaching a polymeric body to a polymeric sheet. It is particularly desirable to provide a low-cost method of integrally molding a body within a blow-molded article. Another object of the invention is to provide a valve and method of attachment which enables a vapor vent valve to be integrally molded within a fuel tank to eliminate the additional assembly steps of affixing or attaching the valve to the tank. If is also desirable to form the fuel tank wall integral with the vapor vent valve.

SUMMARY OF THE INVENTION

These needs are met by an assembly comprising a wall made from a plastic sheet that is pliable at a first elevated temperature. A body having a penetrating portion and a connecting portion forms an aperture in the wall, the connecting portion extends through the aperture and is made from a material resistant to melting at the first temperature. The connecting portion is made from a material that will at least partially melt at the first temperature. The connecting portion engages one surface of the wall, whereby when the wall is raised to the first temperature, the connecting portion partially melts and becomes integral with the wall when returned to ambient temperature.

When the present invention is practiced as a method of attaching a vapor vent valve to a fuel tank, a polymeric projection on the main body casing of the valve becomes an integral part of the fuel tank walls. The lower portion of the main body casing is arrowhead-shaped and has three or more cutting blades which pierce a parison used to form the fuel tank walls. The valve is placed within one die piece of a molding tool and a polymeric parison extruded within the mold. The mold is closed and the parison inflated. The expanding walls of the parison contact the lower portion of the main body casing and the cutting blades pierce the parison. The parison continues to inflate and seal about the projection and the perimeter of the main body casing. The projection partially melts and becomes integral with the fuel tank walls.

In accordance with one aspect of the present invention, an improved fuel tank valve adapted to be integrally molded directly to a polymeric fuel tank assembly is provided, comprising a main body casing having at least one inlet for communicating with the internal chamber of a polymeric fuel tank, an outlet for communicating with a point external to the fuel tank, and a passageway which communicates with the inlet and outlet. A means located within the casing controls fluid flow through said passageway between the inlet and outlet. A connecting means integrally connects the main body casing to the polymeric fuel tank.

The penetrating portion of the main body casing which pierces the parison may be made from a heat-resistant polymeric material such as nylon so as not to melt when contacted with the hot parison. The number and shape of the cutting blades are adapted for cutting an opening conforming to the diameter of the main body casing and the temperature and thickness of the parison. Three or more cutting blades are used for common vapor vent valves and parisons.

The main body casing comprises a substantially cylindrical lower portion having at least one inlet formed therein and having a connecting means joined thereto. The lower portion has a passageway and a penetrating portion. The penetrating portion projects within the internal chamber of the fuel tank and is adapted to pierce the pliable parison as described. A nozzle is connected to the passageway. The nozzle includes an opening therein which extends from the passageway to a second end of the nozzle. The second end of the nozzle defines the outlet.

The connecting means comprises a flange which extends out from and encircles the main body casing to define at least one circumferential projection. The projection is preferably tapered and partially melts when contacted with the hot parison. The projection becomes an integral part of the fuel tank walls and forms a fluid tight connection.

It is an object of the present invention to provide a method of manufacturing a fuel tank having an integrally molded vapor vent valve having a penetrating portion and a means for integrally connecting the valve to the tank by the steps of providing a mold having an aperture receiving the valve. Positioning the valve within the aperture so that the penetrating portion projects toward a cavity within the mold. Positioning a hollow parison within the cavity and closing the mold about the parison. The parison is inflated and caused to impact the penetrating portion. The penetrating portion pierces the parison and the parison seals about the connecting means.

Accordingly, it is an object of this invention to provide an attachment method which uses the penetrating portion of a body to create an aperture in a pliable sheet. The connecting portion of the aperture fuses to the pliable sheet to create a secure attachment.

Another object of the invention is to provide an improved vapor vent valve having an attaching arrangement that provides a low-cost method of assembly that does not require post molding machining of the fuel tank.

These and other objects, features, and advantages of the invention will be apparent from the following description, the accompanying drawings, and the appended claims.

DETAILED DESCRIPTION OF THE PREFERRED EMBODIMENT

Figure 1:
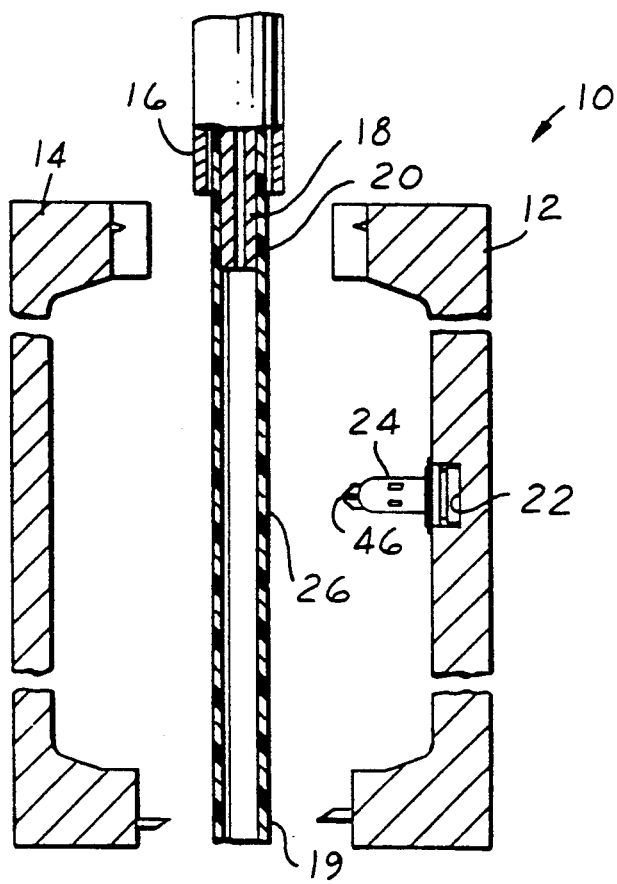
FIG. 1 is a sectional view of a mold tool partially broken away showing the die pieces in the open position.
Figure 2:
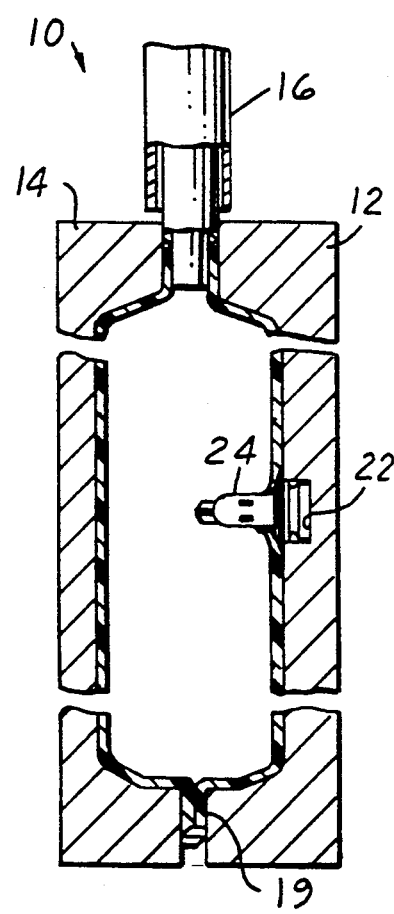
FIG. 2 is a sectional view of a mold tool partially broken away showing the die pieces in the closed position and the parison inflated.
Figure 3:
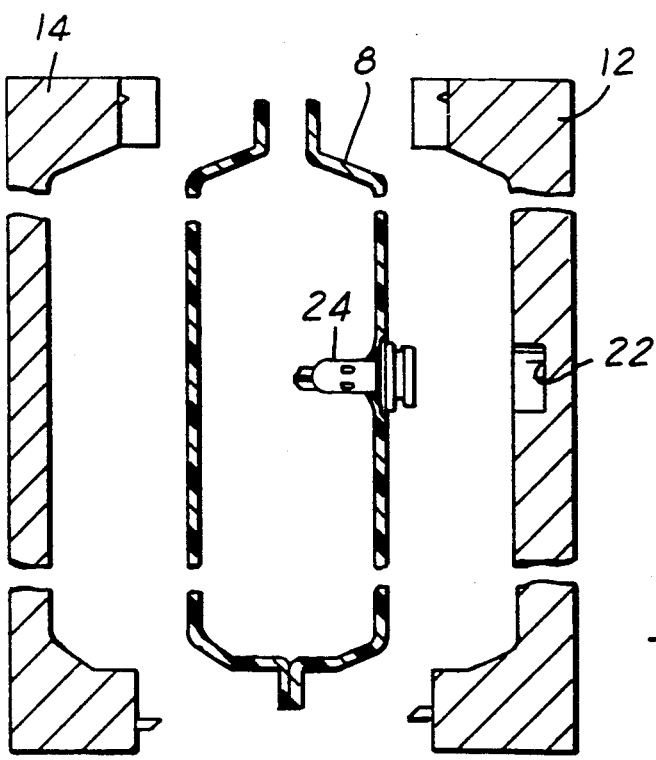
FIG. 3 is a sectional view of a molded tool partially broken away to show the finished molded fuel tank.

Illustrated in FIGS. 1 and 2 is the manufacture of an automotive fuel tank incorporating an integrally molded vapor vent valve. Mold 10 comprises first and second movable die pieces 12, 14, respectively. Extruder 16 extrudes a tubular polymeric parison 20. Mandrel 18, located concentrically within extruder 16, provides a pressurized gas sufficient to at least partially inflate parison 20.

First and second die pieces 12, 14 have an interior shape conforming to the fuel tank exterior surface. First die piece 12 has recess 22 in the side wall. Recess 22 is shaped to receive vapor vent valve 24.

Recess 22 is sized to retain vapor vent valve 24 by press-fit and to properly align it for being integrally molded within fuel tank 8. However, other means of placing or retaining vent valve 24 within mold 10 are possible. Vapor vent valve 24 has an arrowhead-shaped penetrating portion 46 positioned to impact the parison at a near perpendicular angle.

Figure 6:
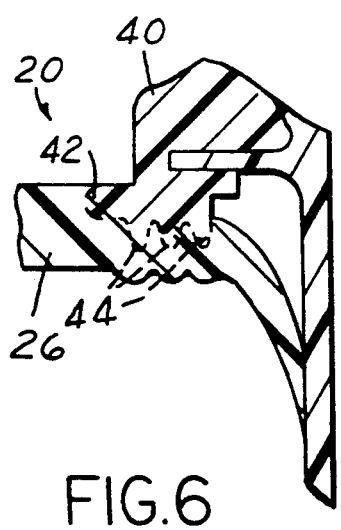
FIG. 6 is a partial side view, in enlarged section of the area labeled FIG. VI in FIG. 4.

A length of parison 20 is extruded to fill mold 10. Die pieces 12, 14 are moved to a closed position as shown in FIG. 2. Die pieces 12, 14 pinch the parison sealed about the periphery of extruder 16 and bottom portion 19. A fluid, such as compressed air, inflates parison 20. Parison wall 26, located in the vicinity of valve 24, impacts penetrating portion 46. Penetrating portion 46 pierces an opening 28 in parison wall 26. Parison wall 26 seals about the periphery of valve 24 as more fully described in FIGS. 4-6.

Figure 4:
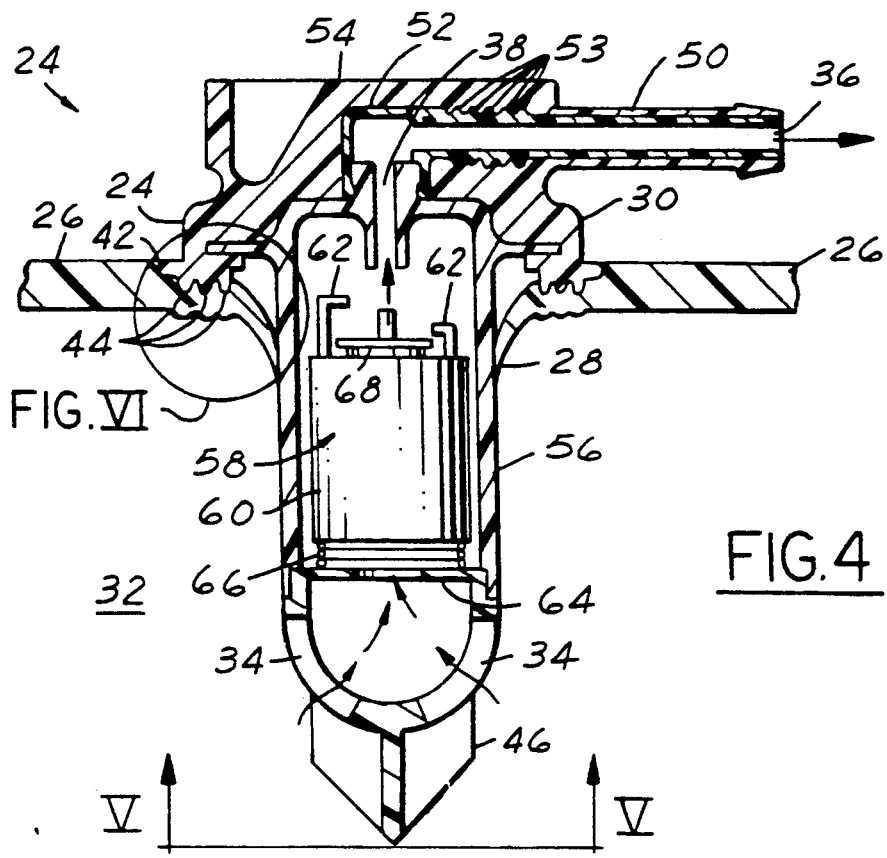
FIG. 4 is a partial side view, in enlarged section, of a the vapor vent valve shown in FIG. 3.
Figure 5:
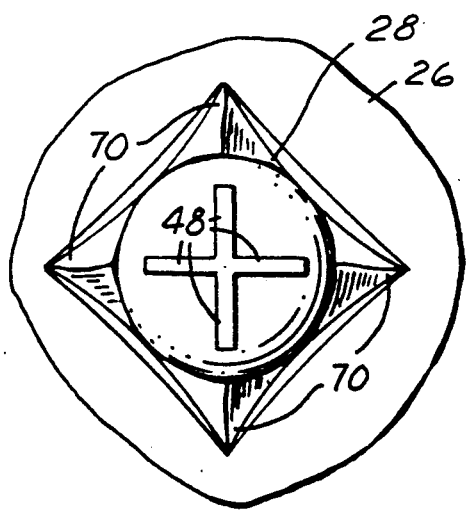
FIG. 5 is a bottom view of the penetrating portion taken along the direction of line V—V in FIG. 4.

FIG. 4 is a detailed sectional view of the vent vapor valve and its sealing arrangement with parison wall 26. Valve 24 comprises a body casing 30 having a generally cylindrical lower portion 56 extending within internal chamber 32 of fuel tank 8. Valve 24 includes inlets 34, outlet 36, and passageway 38. Located within lower portion 56 is a vapor controlling means 58 employed within the valve of the present invention. Controlling means 58 is substantially similar to the one described in U.S. Pat. 4,753,262, incorporated herein by reference. Briefly, controlling means 58 includes a float body 60 having fingers 62 attached at an upper end thereof. Located between the float body 60 and end wall 64 is a compression spring 66 which applies an upwardly directed force upon float body 60. Controlling means 58 further comprises a shut-off element or disk 68 which is located in the space between fingers 62.

Controlling means 58 is designed to allow internal chamber 32 of tank 8 to be normally vented to a point external to the fuel tank. If fuel enters into valve 24 through inlets 34, due to vehicle incline or fuel slosh within the tank 8, float body 60 will move toward passageway 38, forcing disk 68 to seal the passageway. When the fuel level subsequently falls below the level of valve 24, float body 60 will fall to its initial position, as shown in FIG. 4, and fingers 62 will pull disk 68 from passageway 38 and reopen the passageway through valve 24.

Lower portion 56 contains arrowhead-shaped penetrating portion 46. Penetrating portion 46 is designed to pierce a pliable polymeric parison wall. Penetrating portion 46 is preferably substantially similar to the arrowhead shaped needle shown in U.S. Ser. No. 07/693,214, incorporated herein by reference. Penetrating portion 46 comprises four cutting blades 48 terminating in a sharp point. Four cutting blades were found sufficient to pierce a ⅜ inch diameter opening in a parison wall approximately 0.220 inches thick. When using larger diameter valves, a greater number of cutting blades may be useful. Cutting blades 48 form a cross-shaped incision in parison wall 26. Four flap sections 70 are pushed inward by lower portion 56 and project inward toward internal chamber 32. Flap sections 70 remain affixed to parison wall 26 preventing both contamination of valve 24 or interference with other components within fuel tank 80.

Opening 28 in wall 26 is made by contacting parison 20 against penetrating portion 46. Inflation of parison 20 causes the axial movement of wall 26 along the direction of line V—V in FIG. 4. Parison 20 and valve 24 should be positioned nearly perpendicular to one another so that the parison moves linearly along lower portion 56. Nonlinear movement of parison 20 along lower portion 56 would create an oblong opening in wall 26 and possibly interfere with sealing. Flap sections 70 closely conform to the outer perimeter of lower portion 56. The preferred embodiment has described a pliable sheet comprising a blow-molded parison. Other pliable sheets, such as those used in compression molding, are also possible and included within the scope of the present invention. The invention has also been illustrated by showing the pliable sheet moving relative to the valve; however, the valve may be moved relative to the pliable sheet, or both may be moved simultaneously.

Parison 20 is preferably heated to approximately 193° C. to make it more pliable while molding. The pliable parison, at wall 26, contacts connecting flange 40 of body casing 30. Connecting flange 40 preferably has one or more circumferential projection 42 for contacting wall 26. More preferred is for flange 40 to include one or more radially-spaced projections 44 extending with wall 26 at approximately a right angle. As shown by the dashed lines in FIG. 6, projections 42, 44 embed themselves within wall 26. Wall 26 partially encapsulates projections 42, 44 and provides for a mechanical as well as fused attachment. When projections 42, 44 are made of a different or dissimilar material from wall 46, this encapsulation may be used to provide a secure attachment. However, in the preferred embodiment, the material of connecting flange 40 fuses to and becomes a part of the fuel tank wall. Parison 20 transfers some of its heat to projections 42, 44, causing them to partially melt and form an integral bond with wall 26. This melting and fusing is illustrated by the dashed lines between projection 42, 44 and wall 26. In the preferred embodiment of the invention, projections 42, 44 should be made from the same or compatible polymeric material so as to permit this fusion. This fusion bond forms a fluid-tight and secure connection between valve 24 and wall 26. Preferred for automotive fuel tank applications are materials made from high density polyethylene.

Body casing 30 comprises an inner section 52 and an outer section 54. The continuation-in-part of U.S. Ser. No. 07/572,078, incorporated herein by reference, teaches the injection molding of inner section 52 within outer section 54. It is preferable that inner section 52 be made from two pieces which snap together. Ribs 53 surround the outer portion of inner section 52. Ribs 52 secure outer section 54 to inner section 52. Inner section 52 is made of a temperature-resistant polymeric material capable of withstanding temperatures of 200° C. Particularly preferred are nylon 6 and nylon 6/6. The manufacture of inner section 52 from a temperature-resistant material prevents the hot parison from sticking to or melting penetrating portion 46. The temperature-resistant material for inner section 52 also avoids damage to the operation of controlling means 58.

The invention provides a method securing a vent valve to a fuel tank without the additional steps of boring an access hole and separately attaching the vent valve by integrally molding the vent valve. The fuel tank is molded and the vent valve is attached in one operation. The connecting flange of the vent valve becomes integral with and a part of the fuel tank wall. Burrs and other debris normally associated with boring and affixing a vent valve to a fuel tank wall are not present and do not contaminate the valve or fuel tank.

While certain representative embodiments and details have been shown for purposes of illustrating the invention, it will be apparent to those skilled in the art that various changes in the device disclosed herein may be made without departing from the scope of the invention which is defined in the appended claims. For example, different penetrating portions having hollow points or tapered points are possible. The present disclosure comprises these and other variations of the invention.

I claim:

1. An assembly comprising:
   a wall made from a plastic sheet that is pliable at a first elevated temperature, said wall having an aperture;
   a body having a penetrating portion and a connecting portion, said penetrating portion extending through said aperture and being made from a first material resistant to melting at said first temperature, said connecting portion being made from a second material that will at least partially melt at said first temperature, said connecting portion engaging one surface of said wall, and said connecting portion being integral with said wall.

2. The assembly of claim 1, wherein said connecting portion comprises a flange which extends out from and encircles said body to define at least one circumferential projection.

3. The assembly of claim 2, wherein said projection includes at least one radially-spaced projection extending within said wall at approximately a right angle.

4. The assembly of claim 1, wherein said penetrating portion has an arrowhead shape and comprises three or more cutting blades.

5. A polymeric fuel tank assembly having an integral vapor vent valve, comprising:
   a fuel tank having walls defining an internal chamber for containing fuel, said walls having an opening therein, said fuel tank being formed from a first polymeric material;
   a vapor vent valve integrally molded to said walls of said fuel tank within said opening, said vale comprising a main body casing having at least one inlet for communicating with said internal chamber of said fuel tank, an outlet for communicating with a point external to said fuel tank, and a passageway which communicates with said inlet and said outlet;
   said main body casing having a penetrating portion and a connecting portion, said penetrating portion extending through said opening and being made from a first material resistant to melting at a first elevated temperature, said connecting portion being made from a second material that will at least partially melt at said first temperature, said connecting portion engaging one surface of said walls, and said connecting portion being internal with said walls at ambient temperature.

6. The fuel tank assembly of claim 5, wherein said connecting portion comprises a flange which extends out from and encircles said main body casing to define at least two circumferential projections and said projections partially melt within said walls.

7. The fuel tank assembly of claim 5, wherein said penetrating portion comprises an arrowhead shape.

8. The fuel tank assembly of claim 5, wherein connecting portion and walls are made from polyethylene and said penetrating portion is made from nylon.

9. A body adapted to be integrally molded directly to a polymeric wall, comprising:
   a penetrating portion and a connecting portion, said penetrating portion being made from a temperature-resistant material that is rigid at an elevated temperature at which said wall would be plastic, said connecting portion being made from a lower melting material than said penetrating portion and adapted to at least partially melt when said connector portion engages said wall at said elevated temperature, said body having an internal passage that permits fluid communication therethrough.

10. The body of claim 9, wherein said connecting portion comprises a flange which extends out from and encircles said body to define at least one circumferential projection.

11. The body of claim 9, wherein said penetrating portion has an arrowhead shape and three or more cutting blades.

12. A vapor vent valve adapted to be integrally molded directly into a polymeric fuel tank, comprising:
   a main body casing having at least one inlet for communicating with the internal chamber of a polymeric fuel tank, an outlet for communicating with a point external to the fuel tank, and a passageway which communicates with said inlet and said outlet;
   means located within said casing for controlling fluid flow through said passageway between said inlet and said outlet; and
   said main body casing having a penetrating portion and a connecting portion, said penetrating portion being made from a temperature-resistant material that is rigid at an elevated temperature at which said tank would be plastic, said connecting portion being made from a lower melting material than said penetrating portion and adapted to at least partially melt when said connector portion engages said tank at said elevated temperature.

13. The vapor vent valve of claim 12, wherein said penetrating portion has an arrowhead shape with three or more cutting blades being adapted to pierce a pliable parison.

14. A vapor vent valve as claimed in claim 12, wherein said tank and connecting portion are made from polyethylene and said penetrating portion is made from nylon.

* * * * *